US012775742B2

(12) United States Patent
Weggenmann et al.

(10) Patent No.: US 12,775,742 B2
(45) **Date of Patent: *Oct. 27, 2026**

(54) DIFFERENTIALLY PRIVATE VARIATIONAL AUTOENCODERS FOR DATA OBFUSCATION

(71) Applicant: SAP SE, Walldorf (DE)

(72) Inventors: Benjamin Weggenmann, Karlsruhe (DE); Martin Haerterich, Wiesloch (DE); Florian Knoerzer, Karlsruhe (DE)

(73) Assignee: SAP SE, Walldorf (DE)

( * ) Notice: Subject to any disclaimer, the term of this patent is extended or adjusted under 35 U.S.C. 154(b) by 31 days.

This patent is subject to a terminal disclaimer.

(21) Appl. No.: 18/827,444

(22) Filed: Sep. 6, 2024

(65) Prior Publication Data

US 2024/0427936 A1 Dec. 26, 2024

Related U.S. Application Data

(63) Continuation of application No. 17/550,634, filed on Dec. 14, 2021, now Pat. No. 12,105,847.

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
USPC ........................................................... 726/26
See application file for complete search history.

(56) References Cited

U.S. PATENT DOCUMENTS

| | | | | |
|---|---|---|---|---|
| 11,294,756 | B1 * | 4/2022 | Sadrieh | G06F 11/079 |
| 11,374,952 | B1 * | 6/2022 | Coskun | H04L 63/1416 |
| 2020/0090050 | A1 * | 3/2020 | Rolfe | G06N 20/00 |
| 2021/0004677 | A1 * | 1/2021 | Menick | G06N 3/0475 |
| 2023/0185962 | A1 | 6/2023 | Weggenmann et al. | |

OTHER PUBLICATIONS

"U.S. Appl. No. 17/550,634, Examiner Interview Summary mailed Feb. 20, 2024", 3 pgs.
"U.S. Appl. No. 17/550,634, Non Final Office Action mailed Jan. 16, 2024", 13 pgs.
"U.S. Appl. No. 17/550,634, Notice of Allowance mailed Jun. 3, 2024", 11 pgs.
"U.S. Appl. No. 17/550,634, Response filed Mar. 26, 2024 to Non Final Office Action mailed Jan. 16, 2024", 10 pgs.

* cited by examiner

*Primary Examiner* — Linglan Edwards
*Assistant Examiner* — Phuc Pham
(74) *Attorney, Agent, or Firm* — SCHWEGMAN LUNDBERG & WOESSNER, P.A.

(57) ABSTRACT

Techniques for implementing a differentially private variational autoencoder for data obfuscation are disclosed. In some embodiments, a computer system performs operations comprising: encoding input data into a latent space representation of the input data, the encoding of the input data comprising: inferring latent space parameters of a latent space distribution based on the input data, the latent space parameters comprising a mean and a standard deviation, the inferring of the latent space parameters comprising bounding the mean within a finite space and using a global value for the standard deviation, the global value being independent of the input data; and sampling data from the latent space distribution; and decoding the sampled data of the latent space representation into output data.

20 Claims, 5 Drawing Sheets

DIFFERENTIALLY PRIVATE VARIATIONAL AUTOENCODERS FOR DATA OBFUSCATION

CROSS-REFERENCE TO RELATED APPLICATIONS

This application is a continuation of prior application Ser. No. 17/550,634, filed on Dec. 14, 2021, which is incorporated by reference herein in its entirety.

BACKGROUND

In recent years, large-scale collection and processing of sensor data have become important drivers for the digital economy. Continuous streams of sensor data are easy and cheap to be obtained at a large scale. Sequential data, and most prominently time series data, often carries useful information to survey the state of people (e.g., by means of wearable sensors or included in their personal mobile devices), as well of objects (e.g., smart homes, geo-tracking of goods combined with temperature or environmental data).

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
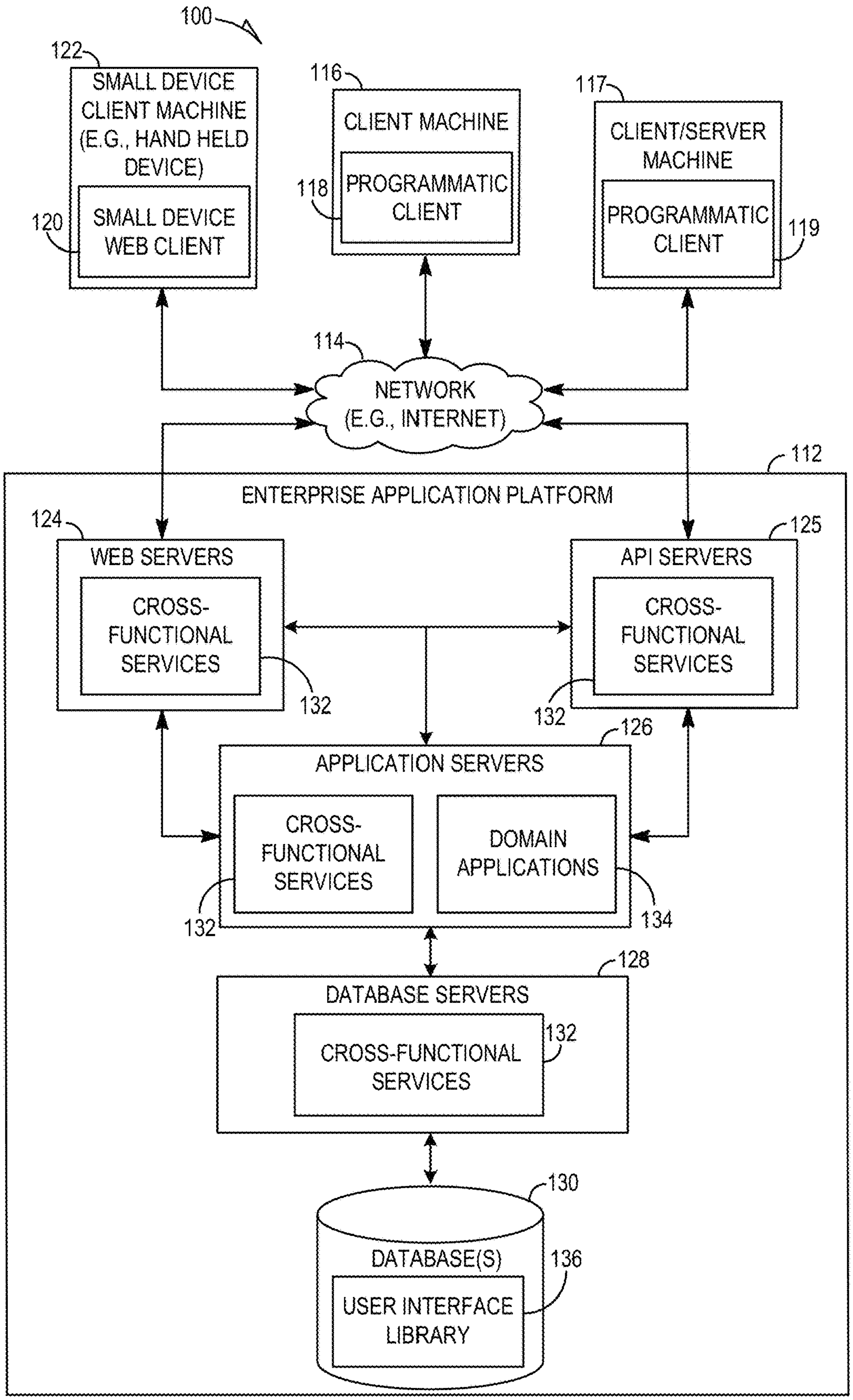
FIG. 1 is an example network diagram illustrating a system.

Example methods and systems for implementing a differentially private variational autoencoder for data obfuscation are disclosed. In the following description, for purposes of explanation, numerous specific details are set forth in order to provide a thorough understanding of example embodiments. It will be evident, however, to one skilled in the art that the present embodiments can be practiced without these specific details.

There are many uses and benefits of collecting and sharing data, such as for applications ranging from predictive maintenance over supply planning, personal health monitoring, and disease diagnosis and prevention. However, this processing of data involves risks to data protection. While sensor data itself does not contain immediate personal identifiers (e.g., usernames, IDs, email addresses, or phone numbers) that are subject to strict data protection regulations, it still is highly privacy-sensitive. Characteristic patterns, such as movements in motion sensor data, may reveal the identity of individuals. Likewise, even if sequential data does not expose any key figures directly, data that is released may leak secret information about patterns related to processes or even strategic decisions of entities, especially when it is part of a time series.

Raw data usually contains information that is not necessary for the task at hand, but that may be (mis)used to gather additional knowledge. Current data obfuscation techniques to reduce the amount of sensitive information that may be leaked when sharing sequential data in order to protect the privacy of individuals or entities to which the data belongs sacrifice either sacrifice privacy protection for data in order to maximize the utility of the data or sacrifice the utility of the data in order to maximize privacy protection for the data. As a result, the underlying computer system fails to sufficiently protect data privacy or to maintain the usefulness of data for downstream processing operations. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to implement a differentially private variational autoencoder for data obfuscation. The computer system may encode input data into a latent space representation of the input data. The latent space representation may comprise a mean and a standard deviation, and the encoding of the input data may comprise bounding the mean within a finite space and using a global value for the standard deviation, where the global value is independent of the input data. Next, the computer system may obfuscate the latent space representation by applying a noise scaling parameter to the standard deviation of the latent space representation. Rather than being the same fixed value for every use case, the noise scaling parameter may be adapted according to the particular privacy requirements of the given situation. The computer system may then sample data from a probability distribution that is based on the mean and the standard deviation of the obfuscated latent space representation. Finally, the computer system may decode the sampled data into output data.

By bounding the mean within a finite space and using a global value for the standard deviation, as disclosed herein, the techniques disclosed in the present disclosure improve the ability of the computer system to protect data privacy and the ability of the computer system to maximize the usefulness of data for downstream processing operations without having to sacrifice one ability for the other. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
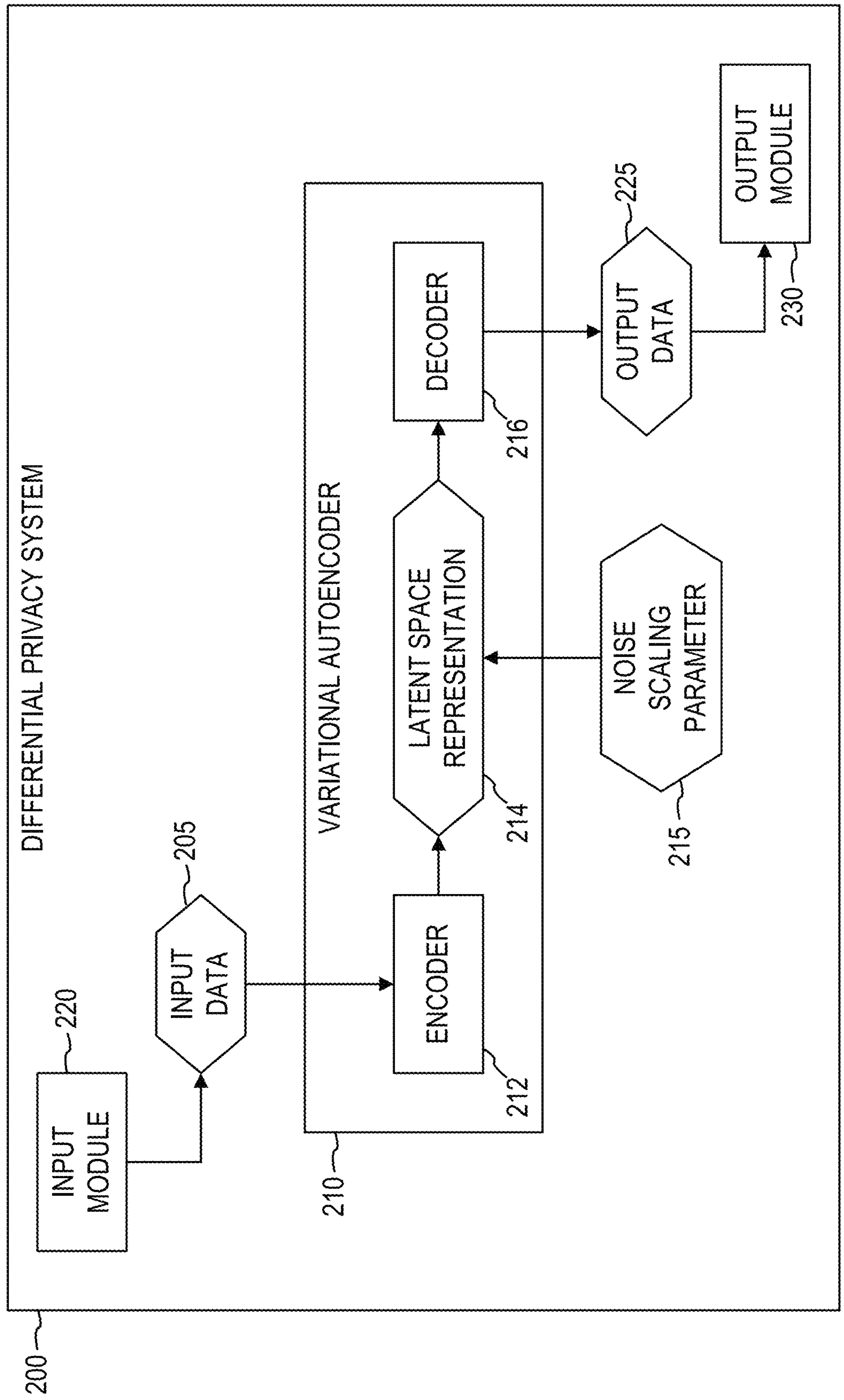
FIG. 2 is a block diagram illustrating an example differential privacy system.

FIG. 2 is a block diagram illustrating an example differential privacy system 200. In some example embodiments, the differential privacy system 200 is configured to implement a differential privacy algorithm that shares information about a dataset by describing the patterns of groups within the dataset while withholding information about entities (e.g., people, organizations) in the dataset. For example, the differential privacy algorithm may analyze a dataset and compute statistics about the dataset, such as the data's mean and variance. Such an algorithm is said to be differentially private if by looking at the output, one cannot tell whether any entity's data was included in the original dataset or not.

In some example embodiments, the differential privacy system 200 comprises a variational autoencoder 210. The variational autoencoder 210 may comprise an encoder 212 and a decoder 216. In training the variational autoencoder, the encoder 212 may encode input data 205 as a probability distribution in a latent space representation 214 of the input data 205, data from the probability distribution of the latent space representation 214 may be sampled, the sampled data may be decoded by the decoder 216, a reconstruction error may be computed, and the reconstruction error may be backpropagated through the variational encoder 210. The encoder 212 and decoder 216 may be trained jointly such that output data 225 of the variational autoencoder 210 minimizes a reconstruction error (e.g., minimizing the differences between the original input values and the reconstructed output values).

In some example embodiments, the differential privacy system 200 uses unsupervised training to train the variational autoencoder 210, such that the encoder 212 maps the input data 205, x, from a feature space F into some latent space L, and the decoder 216 approximately inverts the encoder 212, thereby transforming latent space representations 214 of the input data 205 back to feature space data. The output of the encoder 212 may be probabilistically given by the mean $\mu(x)$ and the variance $\sigma(x)$, and the input of the decoder 216 may be sampled from the isotropic multivariate Gaussian distribution $N(\mu(x),\sigma^2(x))$.

In order to get an obfuscation mechanism from the approach discussed above, the differential privacy system 200 may amplify the sampling of Gaussian noise with standard deviation $\sigma$ by multiplying it with a noise scaling parameter 215, $\kappa\geq1$, to get an effective variance of the sampling of $\kappa\cdot\sigma$, thereby adding some extra amount of uncertainty (noise) to its output in a controlled fashion such that a higher value of $\kappa$ leads to data that is less similar to the corresponding input data 205. In some example embodiments, the differential privacy system 200 may analyze the privacy guarantees in terms of Rényi differential privacy (MIRONOV, Ilya, Rényi Differential Privacy; 2017 IEEE 30th Computer Security Foundations Symposium (CSF). IEEE, 2017. S. 263-275).

Unlike other differential privacy approaches that apply noise directly to the input data 205 itself, the differential privacy system 200 may as adjust or fine tune noise variance by applying a noise scaling parameter 215 to the standard deviation or the variance in the latent space. During the training of the model, $\kappa$ is set to 1. Since the training objective encourages representations in the latent space to be dense (e.g., following a Gaussian prior distribution), the decoder 216 is able to generate a coherent output sequence from the perturbed latent space representation 214.

After having trained the model of the variational autoencoder 210, the differential privacy system 200 may use it to obfuscate data with the desired privacy guarantees as derived above by running it in inference mode with a noise scaling parameter 215, $\kappa\geq1$, resulting in an effective standard deviation $\kappa\cdot\sigma$ that is used for the latent distribution. Feeding original data as input data 205 into the trained variational autoencoder 210, the trained variational autoencoder 210 may translate each input data 205 into an obfuscated output data 225 that may subsequently be used as a surrogate for the original data.

In some example embodiments, the encoder 210 is configured to encode the input data 205 into the latent space representation 214 of the input data 205. The input data 205 may comprise sequential data. For example, the input data 205 may comprise time series data. However, other types of input data 205 and other types of sequential data are also within the scope of the present disclosure. The latent space representation 214 may comprise a mean and a standard deviation. In some example embodiments, the encoding of the input data 205 comprises bounding the mean u, which is output by the encoder 212, within a finite space. Bounding the mean u to keep the maximal distance d of points in the latent space representation 214 finite limits the sensitivity of the encoder function with respect to input data. in a controlled fashion. In some example embodiments, the encoding of the input data 205 also comprises using a global value for the standard deviation $\sigma$, in which the global value is independent of the input data 205. By using a global value for the standard deviation $\sigma>0$ that no longer depends on the input data 205, x, the differential privacy system 200 delivers guarantees that are calculated from the values of $\sigma$ and d. Scaling the global value for the standard deviation $\sigma$ up using appropriate values of $\kappa$ during inference further offers the possibility to adjust the privacy level depending on the requirements.

The guarantees of (ε,δ)-differential privacy come in the form $P \leq e^{\varepsilon} P'+\delta$, where P and P' give the probabilities of the output of data x and x' after obfuscation are inside some arbitrarily chosen test domain (and vice versa with respect to x' and x). The differential privacy system 200 may be configured such that suitable combinations of ε, δ and κ can be chosen along with model parameters d and σ to achieve the respective privacy requirements of the scenario at hand. An entity's data thus preprocessed is provably suitable to be sent to a central data processor for either collecting data to fit statistical models that are the basis for research and derived recommendations, and to evaluate individual data in terms of health impact for a single user without impersonating him or her, as well as for other uses.

In some example embodiments, the bounding of the mean μ=μ(x) and the global standard deviation σ are achieved by modifications to the encoder 212. The mean μ may be composed with a smooth bound operation B that contracts the produced value $\hat{\mu}=\tilde{\mu}(x)=B(\mu(x))$ to an L2-ball of a given radius c>0, so that $\|\hat{\mu}\|_2 \leq c$, which may be accomplished in various ways. For example, a "radial" hyperbolic tangent map may be used:

$$\mu \mapsto \hat{\mu} = B(\mu) = \frac{c \tanh(\|\mu\|)}{\|\mu\|}\mu.$$

In another example, a stereographic projection may be used:

$$\mu \mapsto \hat{\mu} = B(\mu) = \frac{c\mu}{\sqrt{1+\|\mu\|^2}}.$$

Furthermore, instead of computing the standard deviation (or variance) as a function σ=σ(x) of the data point x, the differential privacy system 200 uses a global σ that is independent of the input x. This global σ may be some constant positive value that is determined in advance. To check in advance if σ is suitable to achieve a desired Rényi or differential privacy level (α,∈) or (∈,δ), the differential privacy system 200 may follow steps (a)-(d) described below. The differential privacy system 200 may translate this value to the actual Rényi or differential privacy guarantees as expressed by the parameters (α,∈) or (∈,δ), respectively. Conversely, the differential privacy system 200 can also find an appropriate value of σ from a given differential privacy level (∈*, δ) via step (e) below.

Since (ε,δ) differential privacy guarantees may be derived from Rényi differential privacy (RDP), the differential privacy system 200 may use RDP to optimize the privacy parameters, such as by using the following steps:

(a) Choose c>0 such that the bounded latent space with $\|\hat{\mu}\|_2 \leq c$ is large enough to contain the relevant part of the prior standard normal distribution N(0, I) (e.g., c≥3 covers over 99.7% of its probability mass). Note that the sensitivity is Δ=2c.

(b) Chose σ large enough to achieve a reasonable level of differential privacy. At the same time, σ should not be too large, since otherwise the posteriors $N(\tilde{\mu}(x),\sigma^2)$ would approach a uniform distribution over the bounded latent space.

(c) Chose δ as to bound the acceptable risk (e.g., probability of information accidentally being leaked). Relate the RDP parameters α and ε such that for the Gaussian noise parameter σ, $$\varepsilon = \frac{\alpha\Delta^2}{2\sigma^2}$$

leads to (α,ϵ)-RDP and transfer this to (ϵ',δ)-DP where $$\varepsilon' = \frac{\alpha\Delta^2}{2\sigma^2} - \frac{\log\delta}{\alpha-1}.$$

(d) Express ε' (from DP) in terms of α and ε and hence of σ and minimize it to obtain the following result:

$$\varepsilon^* = \frac{\Delta}{\sigma}\left(\frac{1}{2\sigma} + \sqrt{-2\log\delta}\right)$$

which is achieved at:

$$\alpha^* = 1 + \frac{\sigma}{\Delta}\sqrt{-2\log\delta}.$$

(e) Since this ε* is monotonic, we can invert this relation and find for chosen ε* a suitable σ as:

$$\sigma = \frac{\Delta}{2\varepsilon^*}\left(\sqrt{-2\log\delta} + \sqrt{\frac{2\varepsilon^*}{\Delta} - 2\log\delta}\right).$$

In some example embodiments, the variational autoencoder 210 is configured to obfuscate the latent space representation 214 by applying a noise scaling parameter to the standard deviation of the latent space representation 214. In some example embodiments, the noise scaling parameter controls the sampling of Gaussian noise that is applied before the decoding. For example, the noise scaling parameter may comprise a value that stretches the randomly selected values from a Gaussian distribution. Other types of noise scaling parameters are also within the scope of the present disclosure.

In some example embodiments, the decoder 216 is configured to sample data from a probability distribution that is based on the mean and the standard deviation of the obfuscated latent space representation 214. The probability distribution may comprise a Gaussian distribution. However, other types of probability distributions (e.g., Laplace distribution) are also within the scope of the present disclosure.

In some example embodiments, the decoder 216 is configured to decode the sampled data into the output data 225. The encoder 212 may comprise a neural network that compresses the input data 205 into the latent space representation 214 of the input data 205 and outputs parameters of the probability distribution, and the decoder 216 may comprise another neural network that inputs the data sampled from the probability distribution and decompresses the sampled data into the output data 225. The variational autoencoder 210 may comprise a sequential encoder-decoder architecture. For example, the encoder 212 and the decoder 216 of the variational autoencoder 210 may each comprise their own corresponding plurality of long short-term memory cells, or the encoder 212 and the decoder 216 of the variational autoencoder 210 may each comprise their own corresponding plurality of gated recurrent units. Other components and architectures of the encoder 212 and the decoder 216, as well as of the variational autoencoder 210, are also within the scope of the present disclosure.

In some example embodiments, the differential privacy system 200 comprises an input module 220 that is configured to obtain the input data 205 from a client machine (e.g., the client machine 116 or the small device client machine 122 of FIG. 1) prior to the encoding of the input data 205 by the encoder 212. The input module 220 of the differential privacy system 200 may be implemented on the client machine and retrieve or otherwise receive the input data 205 from a component of the client machine, such as from an application (e.g., a mobile application) or a data storage (e.g., a database) on the client machine. In other example embodiments, the input module 220 of the differential privacy system 200 is implemented on a server machine and receives the input data 205 from a component of the client machine, such as from an application (e.g., a mobile application) or a data storage (e.g., a database) on the client machine. For example, the input module 220 may be implemented on a server machine of a trusted third party. A trusted third party is an entity that facilitates interactions between two parties who both trust the trusted third party. Other types of server machines are also within the scope of the present disclosure.

The variational autoencoder 210 may be implemented on the client machine. Alternatively, the variational autoencoder 210 may be implemented on a server machine, such as on the server machine of the trusted third party. In some example embodiments, one or more components of the variational autoencoder 210 may be implemented on the client machine, while one or more other components of the variational autoencoder 210 may be implemented on the server machine.

The differential privacy system 200 may comprise an output module 230 that is configured to transmit the output data 225 to the server machine via a network, such as via the network 114 of FIG. 1. In some example embodiments, the output module 230 of the differential privacy system 200 is implemented on the client machine. In other example embodiments, the output module 230 of the differential privacy system 200 is implemented on a server machine of a trusted third party, and the output module 230 transmits the output data 225 to another server machine of a non-trusted third party. The server machine to which the output data 225 is transmitted may then use the output data 225 in one or more downstream operations. Examples of such downstream operations may include, but are not limited to, health monitoring operations, business applications, and information technology applications. Examples of health monitoring applications include, but are not limited to, recognition of physical activity (e.g., for fitness tracking or diabetes prevention), sleep quality monitoring, attribution of risk score due to physiological sensor data patterns (e.g., early detection of Parkinson's disease by monitoring coordinative and motor skills), and monitoring cardiovascular activity (e.g., heart rate and heart rate variability) and pulmonary health monitoring (e.g., to detect respiratory problems or to support lung rehabilitation exercises). Examples of business applications include, but are not limited to, price forecasting, demand planning, and fraud detection. Examples of information technology applications include, but are not limited to, attack detection and resource planning.

Figure 3:
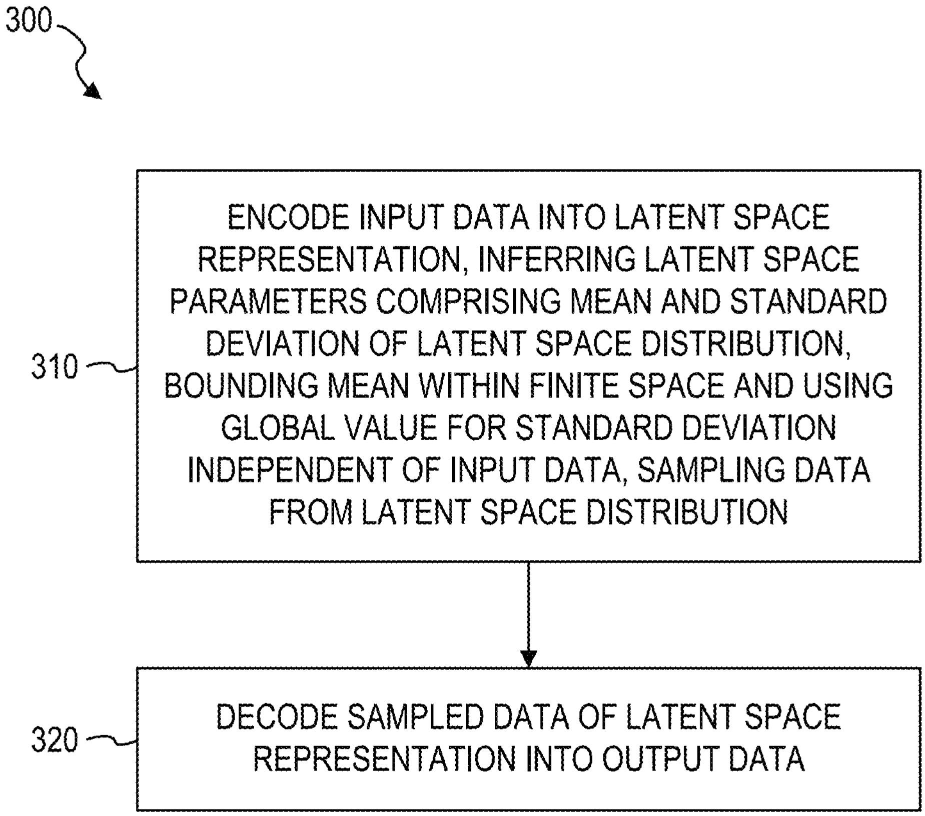
FIG. 3 is a flowchart illustrating an example method of implementing differential privacy.

FIG. 3 is a flowchart illustrating an example method 300 of implementing differential privacy. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the differential privacy system 200 of FIG. 2 or any combination of one or more of its components (e.g., the variational autoencoder 210).

At operation 310, the differential privacy system 200 encodes input data 205 into a latent space representation 214 of the input data 205. The input data 205 may comprise sequential data. For example, the input data 205 may comprise time series data. However, other types of input data 205 and other types of sequential data are also within the scope of the present disclosure. The differential privacy system 200 may obfuscate the latent space representation 214 by applying noise to the latent space representation 214. In some example embodiments, the noise comprises Gaussian noise. For example, the noise may comprise a value that is randomly selected from a Gaussian distribution. Other types of noise are also within the scope of the present disclosure. In some example embodiments, the encoding of the input data 205 comprises inferring latent space parameters of a latent space distribution based on the input data 205, where the latent space parameters comprise a mean and a standard deviation. The inferring of the latent space parameters may comprise bounding the mean within a finite space and using a global value for the standard deviation, where the global value is independent of the input data 205. The encoding of the input data 205 may also comprise sampling data from the latent space distribution.

At operation 320, the differential privacy system 200 may decode the sampled data of the latent space representation into output data 225. In some example embodiments, the differential privacy system 200 comprises a variational autoencoder 210 that performs the encoding at operation 310 and the decoding at operation 320. The variational autoencoder 210 may comprise an encoder 212 and a decoder 216, where the encoder 212 comprises a neural network that compresses the input data 205 into the latent space representation 214 of the input data 205 and outputs parameters of the probability distribution discussed above with respect to operation 330, and the decoder 216 comprises another neural network that inputs the data sampled from the probability distribution at operation 310 and decompresses the sampled data into the output data 225. The encoder 212 and the decoder 216 of the variational autoencoder 210 may each comprise their own corresponding plurality of long short-term memory cells. Alternatively, the encoder 212 and the decoder 216 of the variational autoencoder 210 may each comprise their own corresponding plurality of gated recurrent units. Other components and architectures of the encoder 212 and the decoder 216, as well as of the variational autoencoder 210, are also within the scope of the present disclosure.

It is contemplated that any of the other features described within the present disclosure can be incorporated into the method 300.

Figure 4:
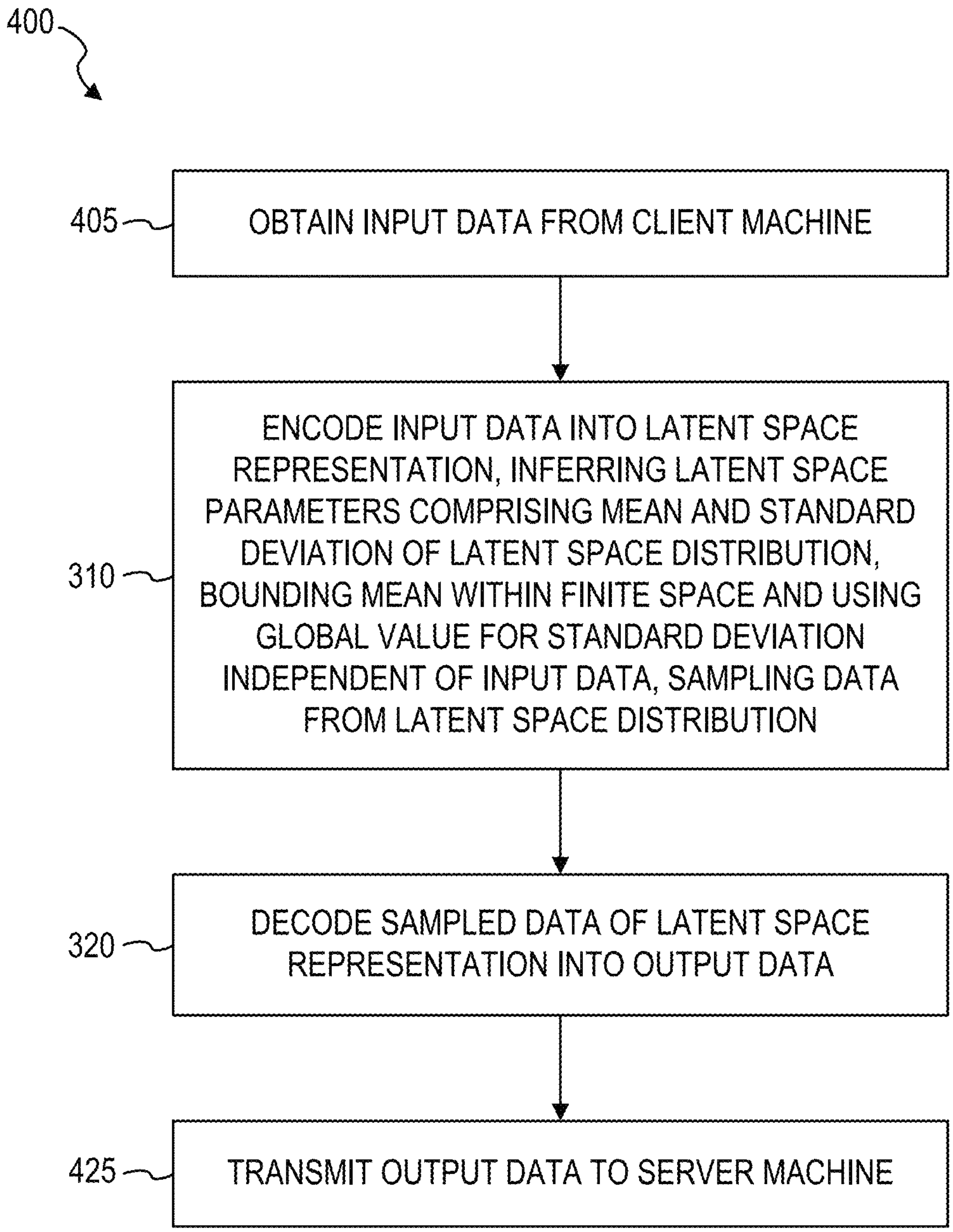
FIG. 4 is a flowchart illustrating another example method of implementing differential privacy.

FIG. 4 is a flowchart illustrating another example method 400 of implementing differential privacy. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the differential privacy system 200 of FIG. 2 or any combination of one or more of its components (e.g., the variational autoencoder 210, the input module 220, the output module 230). The method 400 may include operation 405 being performed prior to operation 310 of the method 300 of FIG. 3, and the method 400 may also include operation 425 being performed subsequent to operation 320 of the method 300 of FIG. 3.

At operation 405, the input module 220 of the differential privacy system 200 may obtain the input data 205 from a client machine prior to the encoding of the input data 205 at operation 410. In some example embodiments, the input module 220 of the differential privacy system 200 is implemented on the client machine and retrieves or otherwise receives the input data 205 from a component of the client machine, such as from an application (e.g., a mobile application) or a data storage (e.g., a database) on the client machine. In other example embodiments, the input module 220 of the differential privacy system 200 is implemented on a server machine and receives the input data 205 from a component of the client machine, such as from an application (e.g., a mobile application) or a data storage (e.g., a database) on the client machine. For example, the input module 220 may be implemented on a server machine of a trusted third party. However, other types of server machines are also within the scope of the present disclosure.

Next, the differential privacy system 200 may encode the obtained input data 205 into the latent space representation 214, at operation 310, and then decode the sampled data of the latent space representation 214 into the output data 225, at operation 320, as previously discussed with respect to the method 300 of FIG. 3. In some example embodiments, the components of the differential privacy system 200 that perform the operations 310 and 320 are implemented on the client machine. In other example embodiments, the components of the differential privacy system 200 that perform the operations 310 and 320 are implemented on a server machine, such as on a server machine of a trusted third party.

Then, the output module 230 of the differential privacy system 200 may transmit the output data 225 to a server machine via a network, at operation 425. In some example embodiments, the output module 230 of the differential privacy system 200 is implemented on the client machine. In other example embodiments, the output module 230 of the differential privacy system 200 is implemented on a server machine of a trusted third party, and the output module 230 transmits the output data 225 to another server machine of a non-trusted third party. The server machine to which the output data 225 is transmitted may then use the output data 225 in one or more downstream operations. Examples of such downstream operations may include, but are not limited to, health monitoring operations, business applications, and information technology applications.

It is contemplated that any of the other features described within the present disclosure can be incorporated into the method 400.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: encoding input data into a latent space representation of the input data, the latent space representation comprising a mean and a standard deviation, the encoding of the input data comprising bounding the mean within a finite space and using a global value for the standard deviation, the global value being independent of the input data; obfuscating the latent space representation by applying a noise scaling parameter to the standard deviation of the latent space representation; sampling data from a probability distribution that is based on the mean and the standard deviation of the obfuscated latent space representation; and decoding the sampled data into output data.

Example 2 includes the computer-implemented method of example 1, wherein the encoding, the obfuscating, the sampling, and the decoding are performed by a variational autoencoder.

Example 3 includes the computer-implemented method of example 1 or example 2, wherein the variational autoencoder comprises a plurality of long short-term memory cells.

Example 4 includes the computer-implemented method of any one of examples 1 to 3, wherein the variational autoencoder comprises a plurality of gated recurrent units.

Example 5 includes the computer-implemented method of any one of examples 1 to 4, wherein the input data comprises sequential data.

Example 6 includes the computer-implemented method of any one of examples 1 to 5, wherein the probability distribution comprises a Gaussian distribution.

Example 7 includes the computer-implemented method of any one of examples 1 to 6, further comprising: obtaining the input data from a client machine prior to the encoding of the input data; and transmitting the output data to a server machine via a network.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 5:
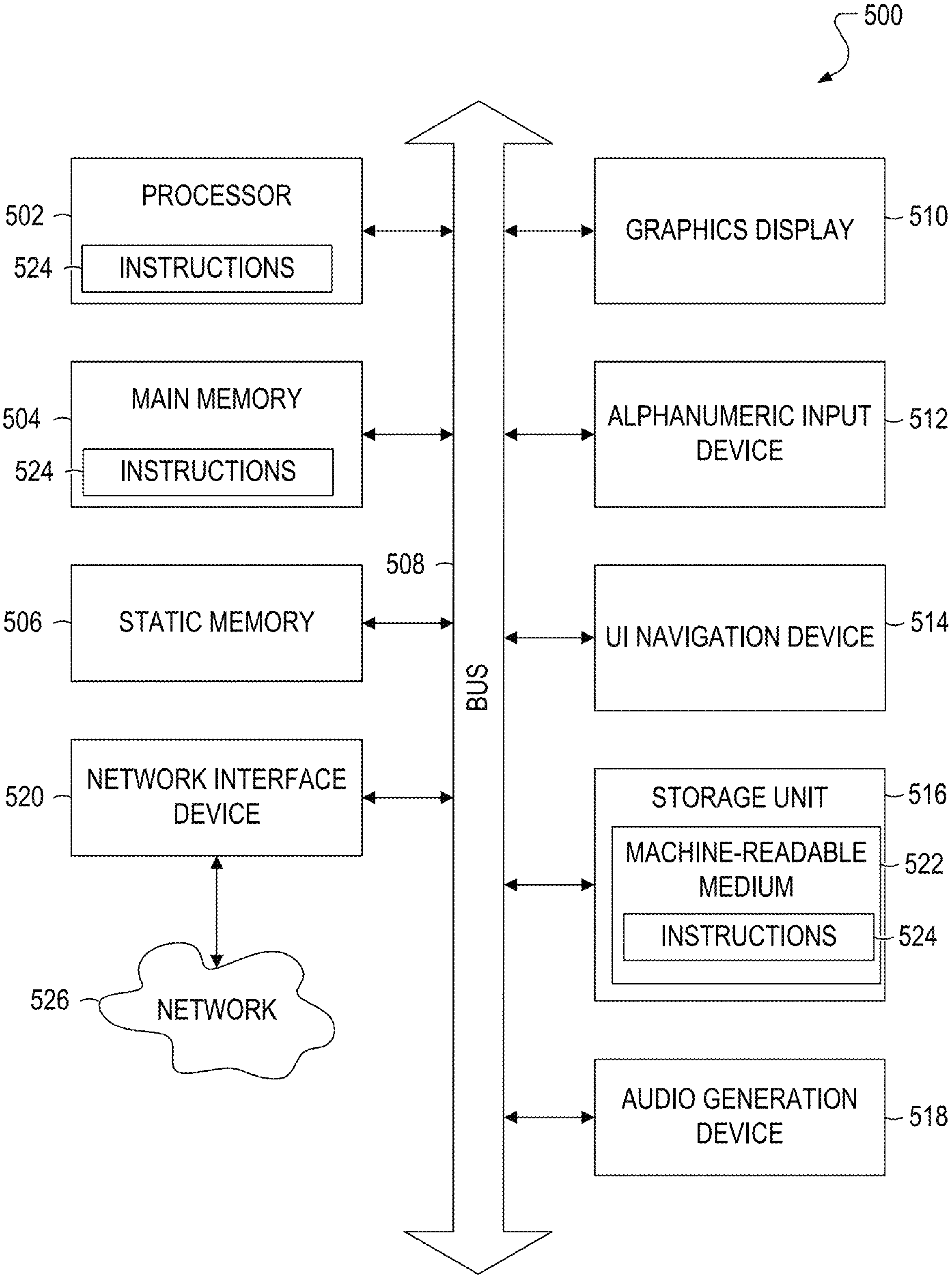
FIG. 5 is a block diagram of an example computer system on which methodologies described herein can be executed.

FIG. 5 is a block diagram of a machine in the example form of a computer system 500 within which instructions 524 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504, and a static memory 506, which communicate with each other via a bus 508. The computer system 500 may further include a graphics or video display unit 510 (e.g., a liquid crystal display (LCD) or a cathode ray tube (CRT)). The computer system 500 also includes an alphanumeric input device 512 (e.g., a keyboard), a user interface (UI) navigation (or cursor control) device 514 (e.g., a mouse), a storage unit (e.g., a disk drive unit) 516, an audio or signal generation device 518 (e.g., a speaker), and a network interface device 520.

The storage unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside, completely or at least partially, within the static memory 506.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system of comprising:

at least one hardware processor;

a variational autoencoder comprising:

an encoder configured to:

access input data;

encode the input data into a latent space representation by inferring a mean of the latent space representation bounded within a finite space and using a global value for a standard deviation of the mean, the bounding of the mean using a hyperbolic tangent that maps the mean to a scaled radial contraction or a stereographic projection that maps the mean to a ratio-scaled contraction, and the global value being independent of the input data; and sample data from the latent space representation; and a decoder configured to:

decode the sampled data of the latent space representation into output data.

2. The system of claim 1, wherein the encoder is a first neural network.

3. The system of claim 2, wherein the decoder is a second neural network.

4. The system of claim 3, wherein the second neural network comprises a second plurality of long short-term memory cells.

5. The system of claim 3, wherein the second neural network comprises a second plurality of gated recurrent units.

6. The system of claim 2, wherein the first neural network comprises a first plurality of long short-term memory cells.

7. The system of claim 2, wherein the first neural network comprises a first plurality of gated recurrent units.

8. The system of claim 1, wherein the system is located on a server machine of a trusted third-party that facilitates interactions between two parties other than the trusted third-party.

9. The system of claim 8, wherein the variational autoencoder further comprises an output module configured to send the output data to a non-trusted third-party.

10. A method comprising:

accessing, at an encoder within a variational autoencoder, input data;

encoding, by the encoder, the input data into a latent space representation by inferring a mean of the latent space representation bounded within a finite space and using a global value for a standard deviation of the mean, the bounding of the mean using a hyperbolic tangent that maps the mean to a scaled radial contraction or a stereographic projection that maps the mean to a ratio-scaled contraction, and the global value being independent of the input data; and sampling, by the encoder, data from the latent space representation; and decoding, by a decoder within the variational autoencoder, the sampled data of the latent space representation into output data.

11. The method of claim 10, wherein the encoder is a first neural network.

12. The method of claim 11, wherein the decoder is a second neural network.

13. The method of claim 12, wherein the second neural network comprises a second plurality of long short-term memory cells.

14. The method of claim 12, wherein the second neural network comprises a second plurality of gated recurrent units.

15. The method of claim 11, wherein the first neural network comprises a first plurality of long short-term memory cells.

16. The method of claim 11, wherein the first neural network comprises a first plurality of gated recurrent units.

17. The method of claim 10, wherein the method is performed a server machine of a trusted third-party that facilitates interactions between two parties other than the trusted third-party.

18. The method of claim 17, further comprising sending the output data to a non-trusted third-party.

19. A non-transitory machine-readable medium storing instructions which, when executed by one or more processors, cause the one or more processors to perform operations comprising:

accessing, at an encoder within a variational autoencoder, input data;

encoding, by the encoder, the input data into a latent space representation by inferring a mean of the latent space representation bounded within a finite space and using a global value for a standard deviation of the mean, the bounding of the mean using a hyperbolic tangent that maps the mean to a scaled radial contraction or a stereographic projection that maps the mean to a ratio-scaled contraction, and the global value being independent of the input data; and sampling, by the encoder, data from the latent space representation; and decoding, by a decoder within the variational autoencoder, the sampled data of the latent space representation into output data.

20. The non-transitory machine-readable medium of claim 19, wherein the encoder is a first neural network.

* * * * *